(12) United States Patent
Pokinskyj

(10) Patent No.: US 10,710,403 B2
(45) Date of Patent: Jul. 14, 2020

(54) WORK AID FOR A HAIRDRESSER

(71) Applicant: Efalock Professional Tools GmbH, Wuerzburg (DE)

(72) Inventor: Stefan Pokinskyj, Rossdorf (DE)

(73) Assignee: Efalock Professional Tools GmbH, Wuerzburg (DE)

( * ) Notice: Subject to any disclaimer, the term of this patent is extended or adjusted under 35 U.S.C. 154(b) by 0 days.

(21) Appl. No.: 16/144,703

(22) Filed: Sep. 27, 2018

(65) Prior Publication Data

US 2019/0092094 A1 Mar. 28, 2019

(51) Int. Cl.
*B60N 2/38* (2006.01)
*B60B 33/00* (2006.01)
*A47C 7/00* (2006.01)
*A45D 44/02* (2006.01)
*A47B 31/00* (2006.01)
*A45D 44/04* (2006.01)
*B62B 3/00* (2006.01)

(52) U.S. Cl.
CPC .......... *B60B 33/0039* (2013.01); *A45D 44/02* (2013.01); *A45D 44/04* (2013.01); *A47B 31/00* (2013.01); *A47C 7/006* (2013.01); *B60B 33/00* (2013.01); *B60B 33/0028* (2013.01); *B62B 3/005* (2013.01); *A47B 2031/003* (2013.01); *B60B 33/0047* (2013.01); *B60B 2200/22* (2013.01); *B60B 2200/43* (2013.01); *B60B 2900/511* (2013.01); *B60B 2900/541* (2013.01); *B60Y 2200/86* (2013.01); *B62B 2301/04* (2013.01)

(58) Field of Classification Search
CPC .... A47C 1/04; A47C 7/00; A47C 1/11; A47C 7/006; A47B 2031/003; B60B 33/00; B60B 33/0028; B60B 2200/43; B62B 3/005; B62B 2301/04; B60Y 2200/86
USPC .................... 297/188.01, 195.11, 461, 463.1
See application file for complete search history.

(56) References Cited

U.S. PATENT DOCUMENTS

| 3,691,590 | A | * | 9/1972 | Drabert | B60B 33/00 16/18 R |
| 4,183,578 | A | * | 1/1980 | Naganawa | A61G 5/006 297/330 |
| 4,327,462 | A | * | 5/1982 | Eggleston | B60B 33/00 16/47 |
| 4,620,711 | A | * | 11/1986 | Dick | B60N 2/2848 224/153 |
| 5,480,179 | A | * | 1/1996 | Peacock | A61G 5/08 280/250.1 |
| 8,267,261 | B2 | * | 9/2012 | Vanderhoek | A01G 9/143 211/150 |
| 9,375,078 | B2 | * | 6/2016 | Doerflinger | A47B 31/00 |
| 2008/0042474 | A1 | * | 2/2008 | Dickie | B62B 7/06 297/16.2 |

(Continued)

*Primary Examiner* — Chi Q Nguyen
(74) *Attorney, Agent, or Firm* — Mark Terry

(57) ABSTRACT

Work aid for a hairdresser, comprising a mobile frame on which frame a seat surface or at least one storage surface is arranged, wherein the frame comprises at least one castor being arranged rotatably in a fork head, and the castor being arranged on an axle, which axle is arranged insertably in each case with a first end portion on a first fork-shaped receptacle on the fork head and with a second end portion on a second fork-shaped receptacle on the fork head.

6 Claims, 3 Drawing Sheets

(56) References Cited

U.S. PATENT DOCUMENTS

| | | | | |
|---|---|---|---|---|
| 2008/0258515 A1* | 10/2008 | Whiteside | ............... | A47C 9/00 |
| | | | | 297/174 R |
| 2010/0066148 A1* | 3/2010 | Matthews | ............. | A01M 31/02 |
| | | | | 297/423.12 |
| 2011/0285191 A1* | 11/2011 | van Hekken | ............ | A47C 3/04 |
| | | | | 297/299 |
| 2012/0074739 A1* | 3/2012 | Fields | ...................... | A47C 1/11 |
| | | | | 297/156 |
| 2015/0047148 A1* | 2/2015 | Melara | ............... | B60B 33/0028 |
| | | | | 16/47 |

* cited by examiner

WORK AID FOR A HAIRDRESSER

CROSS-REFERENCE TO RELATED APPLICATIONS

This patent application claims priority to German utility patent application number 10 2017 122 403.3 filed Sep. 27, 2017 and titled "Work Aid For A Hairdresser". The subject matter of patent application number 10 2017 122 403.3 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND

Work aids are known in various forms in the hairdressing sector. The most common types of work aids are work trolleys and castor stools, which are part of the basic equipment of all hairdressing salons.

A work trolley, for example, is known from German patent publication number DE 20 2012 004 216. The hairdressing trolley described therein comprises a frame to which storage units (drawers, storage troughs, etc.) are attached. The frame is designed so as to be mobile and for this purpose is equipped with castors on the underside thereof. Castors destined for work aids for a hairdresser are always afflicted with the problem that they can become jammed due to the cut hair, so that they no longer rotate smoothly. This problem is also caused by the fact that the cut hair wraps around the axle of the castors or reaches into the ball bearing of the castor.

It is known to solve the problem of jammed castors in hairdressing trolleys by installing castors with a very large diameter (15 cm and more). Due to the large diameter and the associated high height of the castor axle, less cut hair reaches the area where it can cause the castors to jam. However, the large castors are visually disadvantageous as they are very conspicuous with a diameter of up to 15 cm and create a technical impression for the hairdressing trolley as a whole similar to that of a workshop trolley.

Another type of work aid for a hairdresser is the hairdresser's stool which serves as a seat for the hairdresser during hair cutting. When cutting hair, the hairdresser often has to change position in order to be able to reach all parts of the head to be styled. In order to make these position changes possible while sitting, the hairdresser's stool has several castors on the underside thereof. The castors typically comprise a ball bearing in which a quick-release axle is arranged. The quick-release axle is screwed on both sides with a fork head made of thick sheet steel. The fork head comprises a pin on the upper side thereof, which is inserted into a standardized receptacle on the hairdresser's stool and is locked in place with a spring pin. Also, in this context the problem is known that the castors jam due to the cut hair and thus turn heavily. For cleaning, the screws of the quick-release axle are loosened, and the castor is removed from the fork head in order to remove the hair between the castor and the fork head.

The disadvantage is that this type of cleaning takes a lot of time because all the parts for fixing the castor have to be disassembled. In addition, it is disadvantageous that the castors are to be removed by means of tools, because in a hairdressing salon usually no suitable tool, such as a wrench, is available to this end.

SUMMARY

A work aid for a hairdresser is disclosed. The work aid comprises a mobile frame, on which frame a seat surface or at least one storage surface is arranged, wherein the frame comprises at least one castor being arranged rotatably in a fork head, and the castor being arranged on an axle, which axle is arranged insertably in each case with a first end portion on a first fork-shaped receptacle on the fork head and with a second end portion on a second fork-shaped receptacle on the fork head.

DETAILED DESCRIPTION

Figure 1:
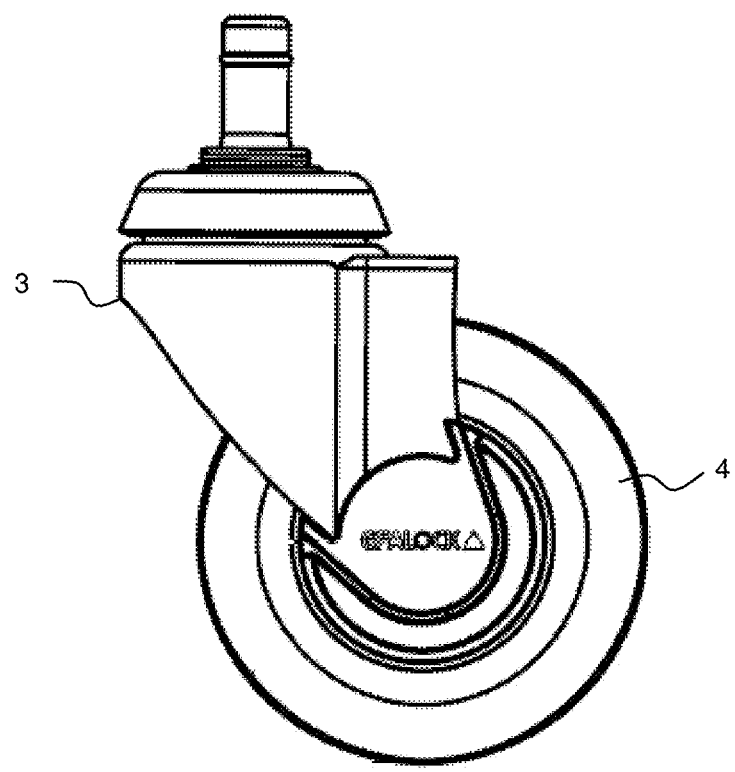
FIG. 1 shows an exemplary embodiment of a castor in a fork head for arrangement on a work aid.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The invention relates to a work aid for a hairdresser according to the independent claim. It is the object of the invention to provide work aids for a hairdresser which overcome the drawbacks of prior art and which are especially quick and easy to clean from cut hair. This object is attained by a work aid for a hairdresser according to the independent claim. Advantageous embodiments constitute the subject-matter of the respective sub-claims.

The invention relate to a work aid for a hairdresser, comprising a mobile frame, on which frame a seat surface (in the case of the hairdresser's stool variant) or at least one storage surface (in the case of the hairdressing trolley variant) is arranged. The frame comprises (in the case of all variants) at least one castor which is arranged rotatably in a fork head. The castor is arranged on an axle (e.g. a quick-release axle). The axle is arranged insertably in each case with a first end portion on a first fork-shaped receptacle on the fork head and with a second end portion on a second fork-shaped receptacle on the fork head. The fork head is a receiving fork for castors, wherein the first end portion and the second end portion form a fork which grips around the castor. In the manner described here, a work aid for a hairdresser is provided, which allows for the castor to be assembled and disassembled without using tools. For this purpose, the castor is only fixed and released by hand.

In accordance with an advantageous technical aspect, the first fork-shaped receptacle and the second fork-shaped receptacle grip around the inserted axle on the respective first end portion and the second end portion in each case by more than half the circumference of the axle. The fork-shaped receptacles thus grip around the respective end portions in such a manner that they are held in the receptacle. In this way, a click mechanism for clicking the axle into the receptacles can be realized. This type of fastening ensures that the castor is held when the work aid is lifted and does not slip out of the fork head.

Another technically preferred aspect provides that the first fork-shaped receptacle and the second fork-shaped receptacle each comprise two receiving projections which are formed resiliently at least in sections. The receiving projections can be formed by narrowly terminating end portions of the fork-shaped receptacle, wherein the resilient design can most easily be realized as a result of the metallic material of the fork head.

A technically preferred variant provides that the receiving projections are arranged on a separate metal sheet. The separate metal sheet is fixedly arranged on the fork head. The separate metal sheet can simply be placed on the fork head in the area of the first and second fork-shaped receptacle. The fixed arrangement, for example, can be achieved by riveting, whereby two or more rivets in particular make it possible to achieve a strong and rotationally fixed arrangement.

It is also preferred that the axle comprises a first circumferential groove-shaped recess on the first end portion and a second circumferential groove-shaped recess on the second end portion. The groove-shaped recess can be brought into engagement with the fork-shaped receptacle. This prevents the axle from being released in the longitudinal direction and from slipping out of the fork-shaped receptacle. The groove limits the relative movement of the axle to the fork-shaped receptacle in the longitudinal direction of the axle.

A particularly advantageous variant provides that the diameter of the axle is in the range of 0.5 cm to 1 cm. The depth of the first and second circumferential groove-shaped recesses is in the range of 1 mm to 2 mm. The specified ranges fulfil the purpose of preventing the axle from moving in the longitudinal direction.

It is also technically advantageous that the work aid further comprises a first protective cap with a first recess being embodied so as to receive the first fork-shaped receptacle therein at least in sections, and a second protective cap with a second recess being embodied so as to receive the second fork-shaped receptacle therein at least in sections. Advantageously, the protective cap covers the inner part of the castor in which the ball bearing is located. The protective cap is only fitted thereon and can be removed by hand, so that it can simply be removed therefrom and fitted thereon again for cleaning.

A preferred aspect provides that the first recess and the second recess are designed symmetrically to one other. For example, when realizing axial symmetry, the protective caps can each be easily assigned to one of the end portions of the fork head.

Particularly preferred is the variant of the work aid with a seat surface (as a hairdresser's stool) and a frame (consisting of a base on which the seat surface is arranged and which rests on a lower part with several holding arms, each of which serves to fasten the castors) and five castors, each of which being arranged rotatably in a fork head. The castors are arranged on an axle. The axle is arranged insertably in each case with a first end portion on a first fork-shaped receptacle on the fork head and with a second end portion on a second fork-shaped receptacle on the fork head. Due to the insertable arrangement, the castors can be easily removed from the hairdresser's stool. This makes it possible to easily clean the castors regularly and in the case where the castor jams, it is possible to make it quickly ready for use again.

The variant of the work aid (as a hairdressing trolley or work trolley for a hairdresser) with more than two storage surfaces (such as drawers or storage troughs or combinations thereof) and a frame (on which the storage surfaces are arranged) is also preferred. Four castors, each being rotatably mounted in a fork head, are arranged on the frame. The castors are arranged on an axle. The axle is arranged insertably in each case with a first end portion on a first fork-shaped receptacle on the fork head and with a second end portion on a second fork-shaped receptacle on the fork head. Hairdressing trolleys designed in this way make it possible to regularly clean the castors easily and, due to improved care, to achieve a longer lifetime.

FIG. 1 shows a castor 4 in a fork head 3. The fork head 3 can be arranged rotatably in the upper area on a work aid (see FIGS. 7 and 8).

Figure 2:
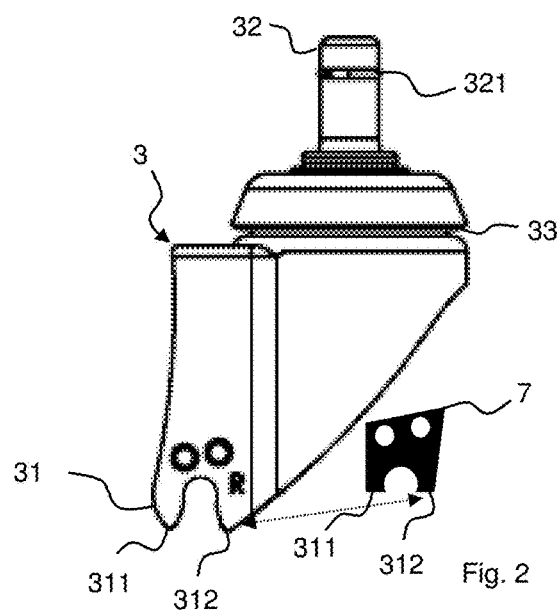
FIG. 2 shows a fork head for the exemplary embodiment shown in FIG. 1.
Figure 3:
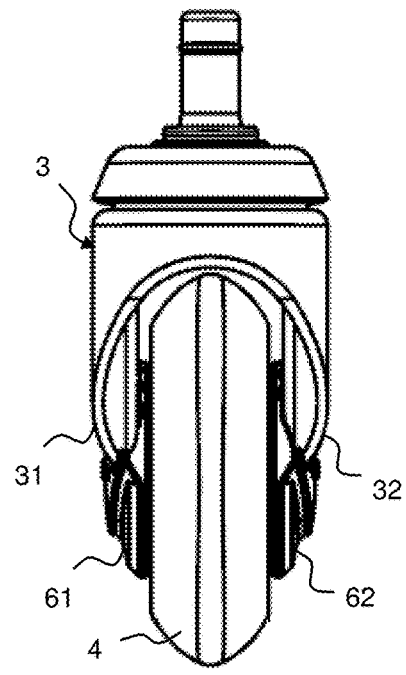
FIG. 3 shows a side view turned by 90° for the exemplary embodiment shown in FIG. 1.

The fork head 3 has a U-shaped fork which is formed from a metal plate of a thickness of approximately 2 to 3 mm. As also shown in FIG. 2 and FIG. 3, the fork head 3 has a first fork-shaped receptacle 31 and a second fork-shaped receptacle 32 being arranged in parallel thereto and at a distance therefrom. For this purpose, the first fork-shaped receptacle 31 and the second fork-shaped receptacle 32 each have two receiving projections 311, 312, which are formed resiliently at least in sections and which surround the axle in the inserted state. Only the receiving projections 311, 312 of the first fork-shaped receptacle are shown, because they cover the receiving projections of the second fork-shaped receptacle. The receiving projections 311, 312 are complementary to the receiving projections 311, 312 and are formed on the separate metal sheet 7, which is firmly riveted to the fork head 3. The shape of the receiving projections 311, 312 is designed so as to provide a click mechanism for clicking in the axle, by gripping around the inserted axle 5 on the respective first end portion 51 and the second end portion 52 by more than half the circumference of the axle 5. The click mechanism is realized by the receiving projections 311, 312 on the metal sheet 7, which accordingly provides resiliency.

Figure 6:
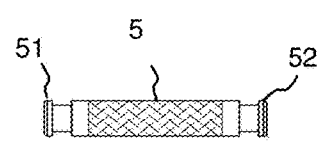
FIG. 6 shows an axle for the exemplary embodiment shown in FIG. 1.
Figure 7:
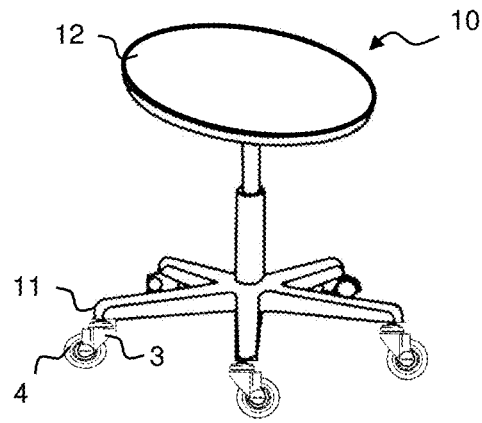
FIG. 7 shows a hairdresser's stool as a work aid according to an exemplary embodiment.
Figure 8:
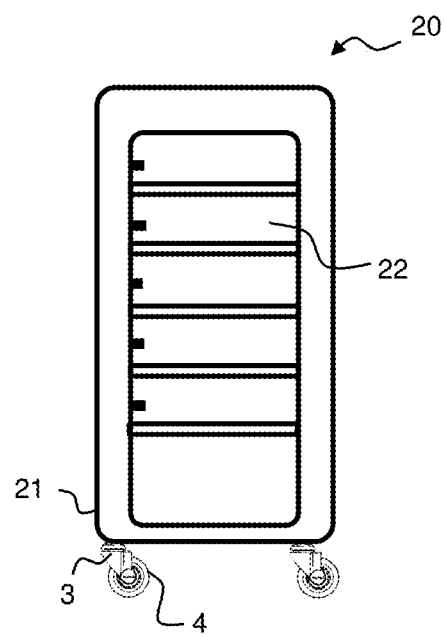
FIG. 8 shows a work trolley for a hairdresser as a work aid according to another exemplary embodiment.

In the upper area of the fork head 3 a pin 32 is provided for fastening in a correspondingly shaped opening on the work aid (reference numbers 10 and 20 in FIGS. 7 and 8). The upper part of the pin 32 is surrounded by a spring ring 321 which is brought into engagement in an opening on the work aid. A ball bearing 33 is arranged on the lower part of the pin 32, which allows the castor to rotate relative to the work aid. In the lower area of the ball head 3 a first fork-shaped receptacle 31 is arranged on the fork head 3, in which the first end portion 51 of an axle 5, as shown in FIG. 6, is accommodated.

Figure 4:
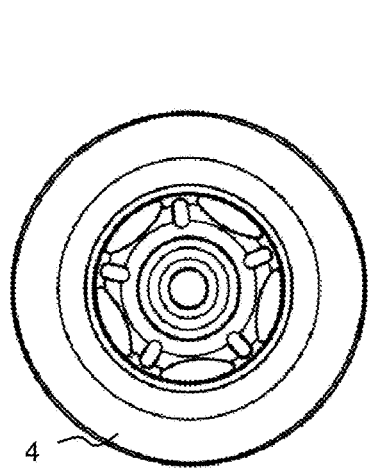
FIG. 4 shows a castor for the exemplary embodiment shown in FIG. 1.
Figure 5:
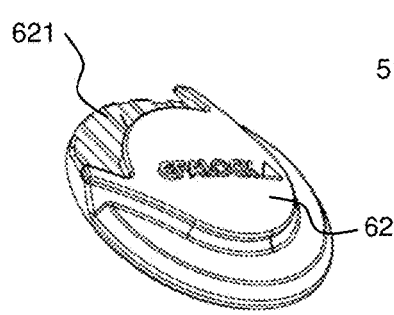
FIG. 5 shows a protective cover for the exemplary embodiment shown in FIG. 1

FIG. 4 and FIG. 5 show a castor 4 and a protective cap 61 to be arranged thereon laterally. The two protective caps 61, 62, which can be seen in FIG. 3, are the protective cap 62 with a second recess 621, which is embodied so as to receive the second fork-shaped receptacle 32 therein in sections.

The axle 5 shown in FIG. 6, in the installed state, is fixed with a first end portion 51 on a first fork-shaped receptacle 31 on the fork head 3. On the opposite side, the axle 5 is inserted with a second end portion 52 on a second fork-shaped receptacle 32 on the fork head 3. The two end portions 51, 52 are each gripped by the receiving fingers 311, 321 on the first or second fork-shaped receptacle 31, 32 by more than half the circumference of axle 5 in each case. To allow a fixed engagement, the two end portions 51, 52 have a circumferential groove which limits the relative movement of the axle to the fork-shaped receptacle in the longitudinal direction.

FIG. 7 shows a work aid 10 with a seat surface 12 in the type of a hairdresser's stool. The work aid 10 has a frame 11 and five castors 4, each being arranged rotatably in a fork head 3, as described above in detail. Here, too, the castor 4 is arranged insertably on an axle in a fork head 3 in such a manner that the advantages of the invention as already described can be realized.

Another variant for a work aid with more than two storage surfaces 22 in the form of four drawers is shown in FIG. 8 in the form of a hairdressing trolley 22. The hairdressing trolley 22 has a frame 21 on which four castors 4, each of which being arranged rotatably in a fork head 3, are arranged insertably as described above.

What is claimed is:

1. A work aid for a hairdresser, comprising a mobile frame on which a seat surface or at least one storage surface is arranged, wherein the mobile frame comprises at least one castor being arranged rotatably in a fork head, the at least one castor being arranged on an axle that is arranged insertably with a first end portion on a first fork-shaped receptacle on the fork head and with a second end portion on a second fork-shaped receptacle on the fork head, wherein the first fork-shaped receptacle and the second fork-shaped receptacle grip around the axle on the respective first end portion and the second end portion by more than half the circumference of the axle, and wherein the first fork-shaped receptacle and the second fork-shaped receptacle each comprises two receiving projections which are formed resiliently in sections.

2. The work aid according to claim 1, wherein the receiving projections are arranged on a separate metal sheet that is fixedly arranged on the fork head.

3. The work aid according to claim 2, wherein the axle comprises a first circumferential groove-shaped recess on the first end portion and a second circumferential groove-shaped recess on the second end portion.

4. The work aid according to claim 3, wherein a diameter of the axle is in a range from 0.5 cm to 1 cm, and wherein a depth of the first and second circumferential groove-shaped recess is in a range from 1 mm to 2 mm.

5. The work aid according to claim 4, further comprising a first protective cap having a first recess embodied so as to receive the first fork-shaped receptacle therein in sections and a second protective cap having a second recess embodied so as to receive the second fork-shaped receptacle therein in sections.

6. The work aid according to claim 5, wherein the first recess and the second recess are designed symmetrically with respect to one another.

* * * * *